United States Patent
Miyake

(10) Patent No.: US 8,886,189 B2
(45) Date of Patent: Nov. 11, 2014

(54) BASE STATION AND METHOD FOR CONTROLLING SAME

(75) Inventor: Takashi Miyake, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 436 days.

(21) Appl. No.: 12/846,067

(22) Filed: Jul. 29, 2010

(65) Prior Publication Data
US 2011/0028142 A1 Feb. 3, 2011

(30) Foreign Application Priority Data
Jul. 29, 2009 (JP) .................................. 2009-176090

(51) Int. Cl.
H04W 40/00 (2009.01)
H04W 24/00 (2009.01)
H04W 60/04 (2009.01)
H04W 84/04 (2009.01)

(52) U.S. Cl.
CPC ............ *H04W 60/04* (2013.01); *H04W 84/045* (2013.01)
USPC ..... 455/436; 455/456.1; 455/444; 455/456.5; 455/439

(58) Field of Classification Search
USPC ......... 455/439, 458, 561, 436, 438, 443, 444, 455/435.1, 456.1; 370/395.42, 444
See application file for complete search history.

(56) References Cited

U.S. PATENT DOCUMENTS

| | | | |
|---|---|---|---|
| 2008/0076419 A1* | 3/2008 | Khetawat et al. | 455/435.1 |
| 2008/0076423 A1* | 3/2008 | Lee et al. | 455/436 |
| 2008/0304451 A1* | 12/2008 | Thompson | 370/331 |
| 2008/0305792 A1* | 12/2008 | Khetawat et al. | 455/435.1 |
| 2009/0068969 A1* | 3/2009 | Lindoff et al. | 455/161.1 |
| 2009/0093252 A1* | 4/2009 | Czaja et al. | 455/436 |
| 2009/0098873 A1* | 4/2009 | Gogic | 455/436 |
| 2009/0310561 A1* | 12/2009 | Grob et al. | 370/331 |
| 2009/0312019 A1* | 12/2009 | Chen et al. | 455/435.2 |
| 2010/0035615 A1* | 2/2010 | Kitazoe et al. | 455/436 |
| 2010/0120394 A1* | 5/2010 | Mia et al. | 455/404.2 |
| 2010/0331000 A1* | 12/2010 | Zhu et al. | 455/444 |

OTHER PUBLICATIONS

NTT Docomo, Press Release, "Development of Small Base Station system for Femtocell" (URL: http://www.nttdocomo.co.jp/info/news_release/page/070710_01.html) English translation, Jul. 10, 2007.

* cited by examiner

*Primary Examiner* — Kent Chang
*Assistant Examiner* — William Lu

(57) ABSTRACT

A method of controlling a base station is disclosed. Wireless signals received by the wireless terminal are checked for connection information indicating an attempt to connect to a second base station. The method determines whether the wireless terminal is located in a coverage area periphery of the base station in based on receiving the wireless signals, if the wireless signals indicate the attempt to connect to the second base station. The registration status of the wireless terminal is checked by the first base station, if the wireless terminal is located in the coverage area periphery.

15 Claims, 8 Drawing Sheets

BASE STATION AND METHOD FOR CONTROLLING SAME

CROSS-REFERENCE TO RELATED APPLICATION

The present application claims priority under 35 U.S.C. §119 to Japanese Patent Application No. 2009-176090, filed on Jul. 29, 2009, entitled "BASE STATION DEVICE AND METHOD FOR CONTROLLING SAME", the content of which is incorporated by reference herein in its entirety.

FIELD

Embodiments of the present disclosure relate generally to base stations for wireless communications, and more particularly relate to a base station for providing coverage for a small communication area.

BACKGROUND

There is an increasing need for mobile high-speed communication systems, particularly wireless terminals, to provide a variety of services such as phone calls, Internet, television, photo sharing, email and downloading music files. Adequate coverage with wireless terminals is now provided to most populated areas of the world.

A wireless base station may be required for many types of wireless communication. For example, wireless base stations (macrocells) and microcell base stations (microcells) can be communicatively coupled to mobile communication networks. Small base stations with low output power with a narrow range with a radius of several approximately several meters or several tens of meters have been developed. Among these small base stations, those that are widely used in individual households to connect to a mobile communication network via a general communication line (i.e., broadband lines such as Asymmetric Digital Subscriber Line (ADSL) are referred to as "femtocell base stations".

A femtocell base station can be installed in a location such as indoors or behind a building where a user may wish to use a wireless terminal. Femtocell base stations can communicate with a mobile communication network and can be installed by a user. Because a communication area can be established in a specific spot (femtocell) within a macrocell even in an urban area, users can improve communication speed by installing femtocell base stations therein. Consequently, it becomes possible to receive the same services provided by conventional base stations—such as telephone calls, email functions, SMS, and web browsing—at higher communication speeds.

During an idle handoff from the femtocell to the macrocell, the wireless terminal may transmit a series of information required for the idle handoff to the macrocell base station serving as a destination for the idle handoff. The wireless terminal and the femtocell base station acting as a source for the idle handoff may not exchange information regarding the idle handoff to the macrocell. Consequently, despite the idle handle off, the femtocell base station may continue to handle the wireless terminal as a registered wireless terminal that is location-registered in the femtocell base station. Thereby, the femtocell base station may perform unnecessary and pointless processes, such as providing notifications of information to the wireless terminal. In this case, the wireless terminal may be forced to respond the notifications. This may result in excessive consumption of the battery of the wireless terminal.

SUMMARY

A method of controlling a base station is disclosed. Wireless signals received by the wireless terminal are checked for connection information indicating an attempt to connect to a second base station. If the wireless signals indicate the attempt to connect to the second base station, then the base station determines whether the wireless terminal is located in a coverage area periphery of the base station. The registration status of the wireless terminal is checked by the base station, if the connection information indicates an attempt to connect to the second base station and the wireless terminal is in the coverage area periphery.

A first embodiment comprises a base station device. The base station comprises a communication module operable to communicate with a wireless terminal, and a monitoring module operable to receive wireless signals transmitted by the wireless terminal to a second base station. The base station further comprises an information determination module operable to determine whether the wireless signals comprise connection information indicating an attempt to connect to the second base station, and an analysis module operable to determine whether the wireless terminal is located in a coverage area periphery of the base station based on receiving the wireless signals. The base station also comprises a management module operable to check a registration status of the wireless terminal, if the wireless signals comprise the connection information and the wireless terminal is in the coverage area periphery.

A second embodiment comprises a method of controlling a base station. The method comprises determining whether wireless signals received from a wireless terminal indicate an attempt to connect to a second base station. The method also determines whether the wireless terminal is located in a coverage area periphery of the base station in based on receiving the wireless signals. The method further comprises checking a registration status of the wireless terminal, if the wireless terminal is located in the coverage area, if the wireless signals indicate the attempt to connect to the second base station.

A third embodiment comprises a computer readable medium comprising program code for operating an information device. The program code comprises code for determining whether wireless signals received from the a wireless terminal comprise connection information indicating an attempt to connect to a second information device. The program code further comprises code for determining whether the wireless terminal is located in a coverage area periphery of the information device, in based on receiving the wireless signals. The program code further comprises code for checking a registration status of the wireless terminal, if the wireless terminal is located in the coverage area and if the wireless signals indicate the attempt to connect to the second information device.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of one practical non-limiting application, namely, a base station. Embodiments of the disclosure, however, are not limited to such base stations, and the techniques described herein may also be utilized in other applications. For example, embodiments may be applicable to access points, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
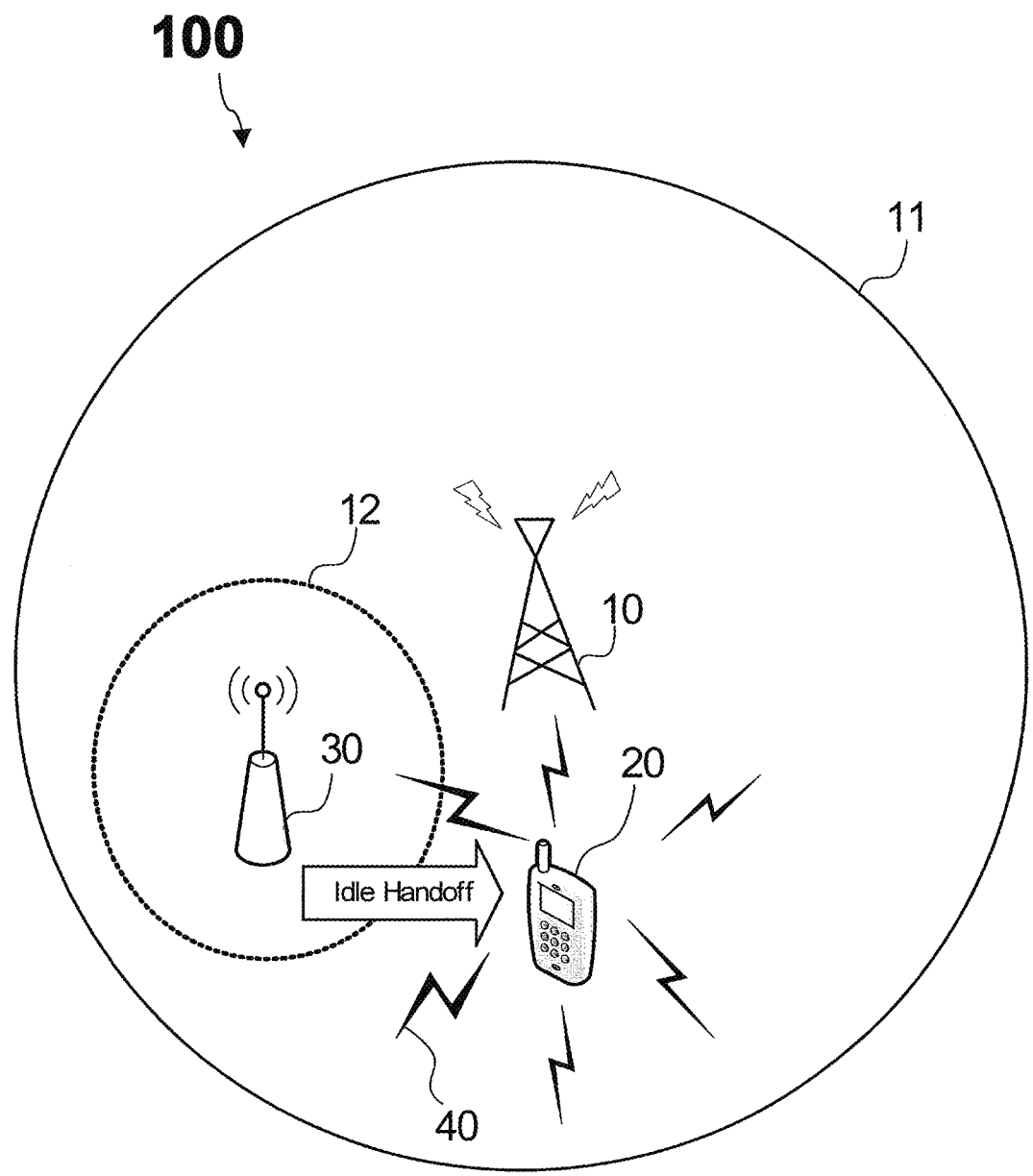
FIG. 1 is an illustration of an exemplary wireless communication environment, according to an embodiment of the present disclosure.

FIG. 1 is an illustration of an exemplary wireless communication environment 100 according to an embodiment of the disclosure. A wireless communication environment 100 comprises a macrocell base station 10 of a public network and a privately installed femtocell base station 30. The macrocell base station 10 and the femtocell base station 30 may communicate with a wireless terminal 20 using a wireless communication protocol based on industry current and future standards. The wireless communication protocol may comprise, for example but without limitation, Third Generation Partnership Project Long Term Evolution (3GPP LTE), Third Generation Partnership Project 2 Ultra Mobile Broadband (3Gpp2 UMB), Time Division-Synchronous Code Division Multiple Access (TD-SCDMA), Wireless Interoperability for Microwave Access (WiMAX), and the like.

The femtocell base station 30 is configured to communicate with the wireless terminal 20 in a femtocell area 12. The macrocell base station 10 is configured to communicate with the wireless terminal 20 in a public network area 11. The femtocell area 12 is within the public network area 11, where the wireless terminal 20 can communicate with the macrocell base station 10. Furthermore, when the wireless terminal 20 moves outside a communication range of the femtocell area 12, after communicating with the femtocell base station 30, the wireless terminal 20 is handed off to the macrocell base station 10 to communicate therewith.

A state in which the wireless terminal 20 is location-registered in a base station and is not engaged in data communication or a telephone call is referred to as "standby mode". When the wireless terminal 20 is handed off from the femtocell base station 30 to the macrocell base station 10 while in the standby mode (hereinafter referred to as an "idle handoff"), the wireless terminal 20 transmits an assignment request to the macrocell base station 10. If the macrocell base station 10 accepts communication with the wireless terminal 20, the macrocell base station 10 transmits an assignment notification to the wireless terminal. Upon receiving the assignment notification, the wireless terminal 20 transmits a completion notification to the macrocell base station 10. In this manner, an idle handoff is completed.

During the idle handoff from the femtocell base station 30 to the macrocell base station 10, the wireless terminal 20 transmits a series of information required for the idle handoff to the macrocell base station 10 serving as a destination for the idle handoff. The wireless terminal 20 and the femtocell base station 30 acting as a source for the idle handoff may not exchange information regarding the idle handoff to the macrocell base station 10. Consequently, despite the idle handle off, the femtocell base station 30 continues to handle the wireless terminal 20 as a registered wireless terminal that is location-registered in the femtocell base station 30. Disregarding that the wireless terminal 20 has been handed off to the macrocell base station 10, may cause the femtocell base station 30 to perform unnecessary and pointless processes, such as providing notifications of information to the wireless terminal 20. This may result in excessive consumption of a battery power of the wireless terminal 20. Embodiment of the disclosure provides a means for reduction or elimination of the unnecessary processes that may be performed by the femtocell base station 30 during the idle handoff, thereby saving the battery power of the wireless terminal 20.

Figure 2:
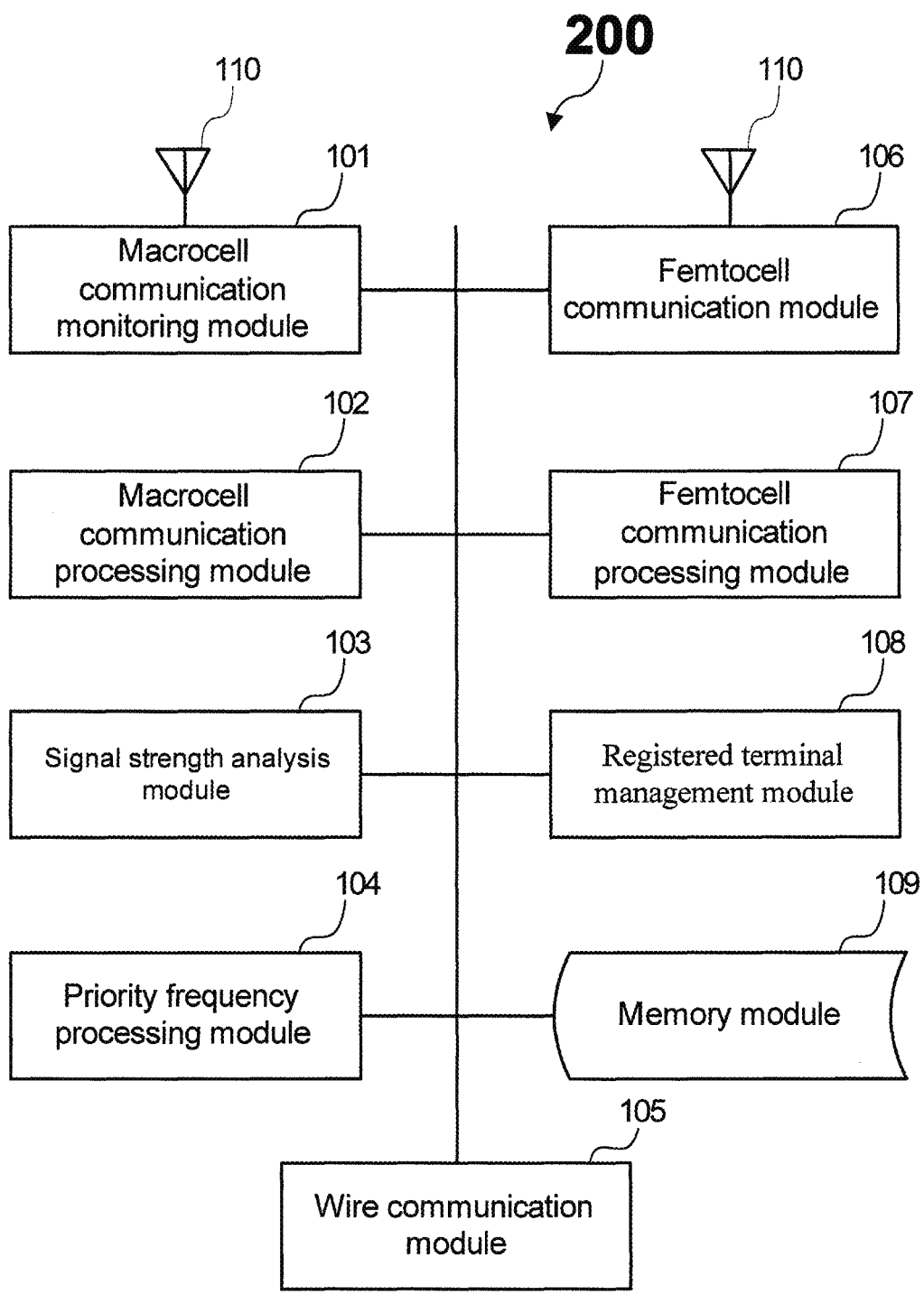
FIG. 2 is an illustration of an exemplary schematic functional block diagram of a femtocell base station, according to an embodiment of the present disclosure.

FIG. 2 is an illustration of an exemplary schematic functional block diagram of a femtocell base station 200 (30 in FIG. 1) according to an embodiment of the disclosure. The femtocell base station 200 comprises a macrocell communication monitoring module 101 (monitoring module), a macrocell communication processing module 102 (information judgment module), a signal strength analysis module 103 (analysis module), a priority frequency processing module 104, a wire communication module 105, a femtocell communication module 106 (communication module), a femtocell communication processing module 107, a registered terminal management module 108, and a memory module 109.

The macrocell communication processing module 102, the signal strength analysis module 103, the priority frequency processing module 104, and the femtocell communication-processing module 107 may each comprise a computer CPU (microprocessor) or another processor for performing a process based on a program (operating system, application program, etc.) stored in the memory module 109. The modules 102/103/104/107 may read instruction code sequentially from programs such as the operating system and the application program, which are stored in the memory module 109, and perform the programs.

The femtocell communication module 106 engages in wireless communication with the wireless terminal 20. The femtocell base station 30 is operable to transmit and receive a plurality of communication signals comprising data signals via the femtocell communication module 106. For example, the femtocell communication module 106 modulates a transmitting signal such a presence checking signal as a radio signal to the wireless terminal 20 through an antenna 110. In addition, the femtocell communication module 106 demodulates a radio signal such as a response to the a presence checking signal that may be received from the wireless terminal 20 through the antenna 110. The antenna 110 may comprise a single antenna or multiple antennas. The femtocell communication module 106 communicates with the wireless terminal 20 via a wireless data communication link 40. The femtocell communication module 106 cooperates with the wireless terminal 20 transceiver (not shown) with a suitably configured RF antenna arrangement such as the antenna 110 that can support a particular wireless communication protocol and modulation scheme as explained above to transmit and receive data signals. The data signals may comprise, for example but without limitation, voice data during voice communication, text data during email, web data during accessing web site, assignment request for terminal identification data and location registration information, and the like.

The femtocell communication-processing module 107 performs processes compliant with the wireless communication protocol and transmits information received from the wire communication module 105 to the wireless terminal 20 via the femtocell communication module 106. Moreover, the femtocell communication-processing module 107 forwards information received from the femtocell communication module 106 to the wire communication module 105.

The wire communication module 105 is communicatively coupled to a broadband line, such as but without limitation, an optical fiber, a Digital Subscriber Line (DSL), and the like, that may be managed by a telecommunications carrier. The wire communication module 105 broadcasts information via the femtocell communication-processing module 107 to a network of the telecommunications carrier.

The memory module 109 is operable to store various kinds of data used for various processes of the femtocell base station 30. The memory module 109 stores registration information of the wireless terminal 20 registered in the femtocell base station 30 when the wireless terminal 20 is location-registered. For example, the memory module 109 may store an identifier of the registered wireless terminal 20. For example, when the wireless terminal 20 moves into the femtocell area 12, the femtocell base station 30 starts a process related to location registration of the wireless terminal 20. Moreover, if the wireless terminal 20 is engaged in a telephone conversation or data communication, the femtocell base station 30 starts a process related to a handoff from another base station. Upon starting the handoff process, the wireless terminal 20 is location-registered in the in the memory module 109.

Moreover the memory module 109 may store a priority channel table 500 (FIG. 5), computer program that is executed by the femtocell communication processing module 107, an operating system (OS), tentative data used in executing a program processing, and the like.

The memory module 109 may be coupled to the femtocell communication-processing module 107 such that the femtocell communication-processing module 107 can read information from and write information to memory module 109. As an example, the femtocell communication-processing module 107 and the memory module 109 may reside in their respective ASICs. The memory module 109 may also be integrated into the femtocell communication-processing module 107. In an embodiment, the memory module 109 may comprise a cache memory for storing temporary variables or other intermediate information during execution of instructions to be executed by the femtocell communication-processing module 107. In practical embodiments the memory module 109 may also comprise non-volatile memory (i.e., non-volatile semiconductor memory, hard disk device, optical disk device, and the like), for storing instructions to be executed by the femtocell communication-processing module 107, a random access storage device (for example, SRAM, DRAM), or any other form of storage medium known in the art.

The macrocell communications monitoring module 101 (monitoring module) monitors wireless signals transmitted from the wireless terminal 20 registered in the femtocell base station 30, to the macrocell base station 10. The wireless signals transmitted by the wireless terminal 20 to the macrocell base station 10 may comprise, for example but without limitation, an "assignment request for terminal identification data", used when the wireless terminal 20 is handed off from the femtocell base station 30 to the macrocell base station 10, while the wireless terminal 20 is in standby mode (i.e., during idle handoff), and the like.

The macrocell communication processing module 102 (information determination module) analyzes the wireless signals received by the macrocell communication monitoring module 101 and determines whether the received wireless signals comprise attempt to connect information (connection information) indicating an attempt to connect to another base station. The attempt to connect information may comprise any information indicating an attempt by the wireless terminal 20 to connect to another base station, such as but without limitation, an assignment request for terminal identification data, a location registration in another base station, and the like.

The signal strength analysis module 103 (analysis module) determines whether the wireless signals received by the macrocell communication monitoring module 101 are from a wireless terminal such as the wireless terminal 20 in a coverage area periphery of the femtocell base station 30.

For example, the signal strength analysis module 103 preliminarily derives (estimates) a projected signal strength of wireless signals transmitted from a wireless terminal located near the femtocell base station 30 to the macrocell base station 10. Based on a received signal strength of the wireless signals at the macrocell communication-monitoring module 101 and the projected signal strength, the signal strength analysis module 103 estimates whether the wireless terminal 20 in the femtocell area 12 is located in the coverage area periphery of the femtocell base station 30. Moreover, the estimation of whether the wireless terminal 20 is located in the coverage area periphery of the femtocell base station 30 may be performed by determining whether the received signal strength of the wireless signals at the macrocell communication-monitoring module 101 is equal to or greater than a predetermined value.

The registered terminal management module 108 manages an increase and decrease of a number of registered wireless terminals using the memory module 109 while also checking the registration status of wireless terminals. For example, if wireless signals received by the macrocell communication-monitoring module 101 comprise information indicating an attempt to connect to another base station such as the macrocell base station 10, then a first condition (condition A) is satisfied. Also, if the analysis results of the signal strength analysis module 103 indicate that the wireless terminal is in the coverage area periphery of the femtocell base station 30, then a second condition (condition B) is satisfied. In addition, if both the first condition (condition A) and the second condition (condition B) are satisfied, the registered terminal management module 108 checks the registration status of the wireless terminal 20 as explained in more detail in the context of discussion of FIG. 3 below. Moreover, when both conditions A and B are met, the registered terminal management module 108 cancels the registration status of the wireless terminal 20. In this manner, the unnecessary processes that may be performed by the femtocell base station 30 during the idle handoff can be eliminated, thereby saving battery power of the wireless terminal 20.

Figure 3:
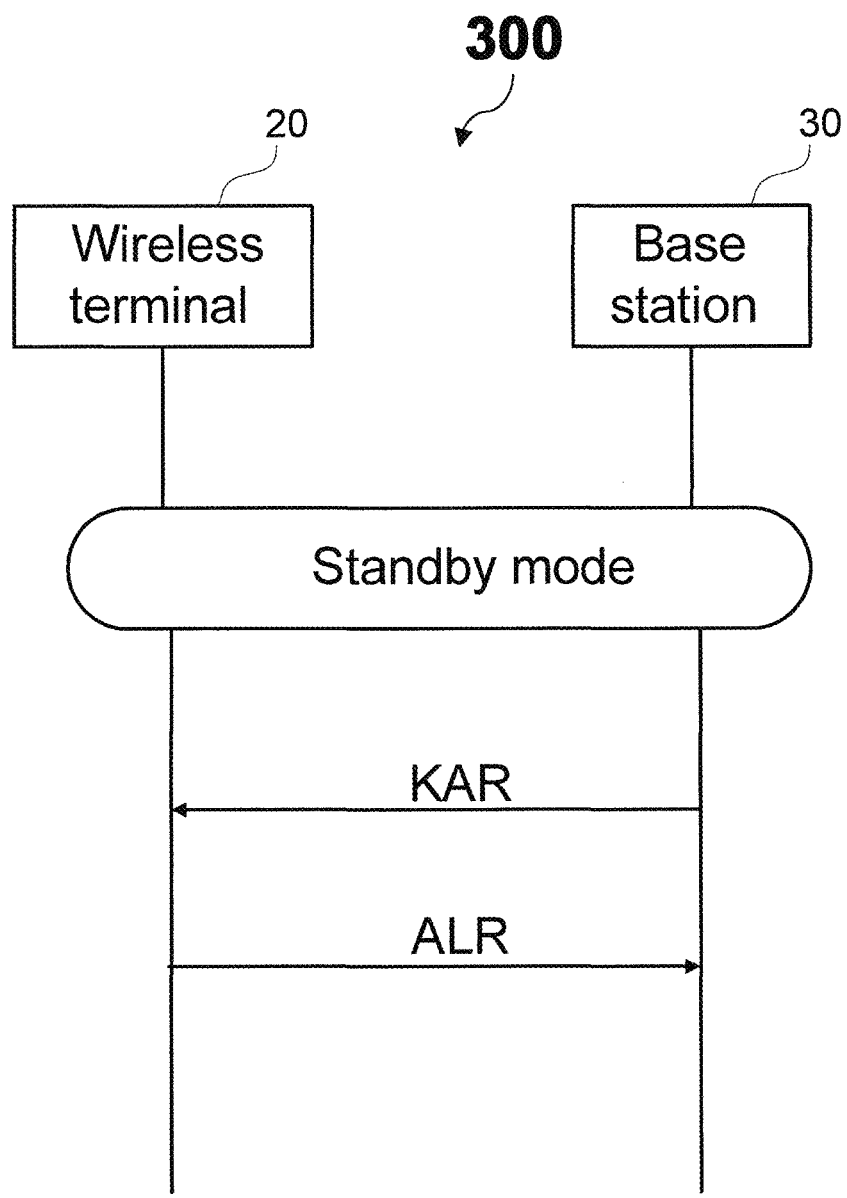
FIG. 3 is an illustration of an exemplary process for checking a registration status of a wireless terminal, according to an embodiment of the present disclosure.

FIG. 3 is an illustration of an exemplary process 300 for checking a registration status of the wireless terminal 20 according to an embodiment of the disclosure. In response to a transmission of a KeepAliveRequest or KAR (presence checking signals for checking whether the wireless terminal is within a communication range (coverage area) of the base station) from the femtocell base station 30 to the wireless terminal 20, the wireless terminal 20 responds with an KeepAliveResponse or ALR to the femtocell base station 30. The KAR and the ALR messages are explained in more detail in CDMA2000 standard for wireless communication.

By executing the transmission and reception of KAR and ALR messages, the femtocell base station 30 can check the registration status of the wireless terminal 20 within the area of the femtocell base station 30. For example, the registered terminal management module 108 causes the femtocell communication module 106 to transmit the KAR to a registered wireless terminal such as the wireless terminal 20. If the wireless terminal 20 does not respond with the ALR, the registered terminal management module 108 cancels the registration status of the wireless terminal 20. Moreover, when the wireless terminal 20 performs location registration, the registered terminal management module 108 registers the wireless terminal 20 using the memory module 109.

Figure 4:
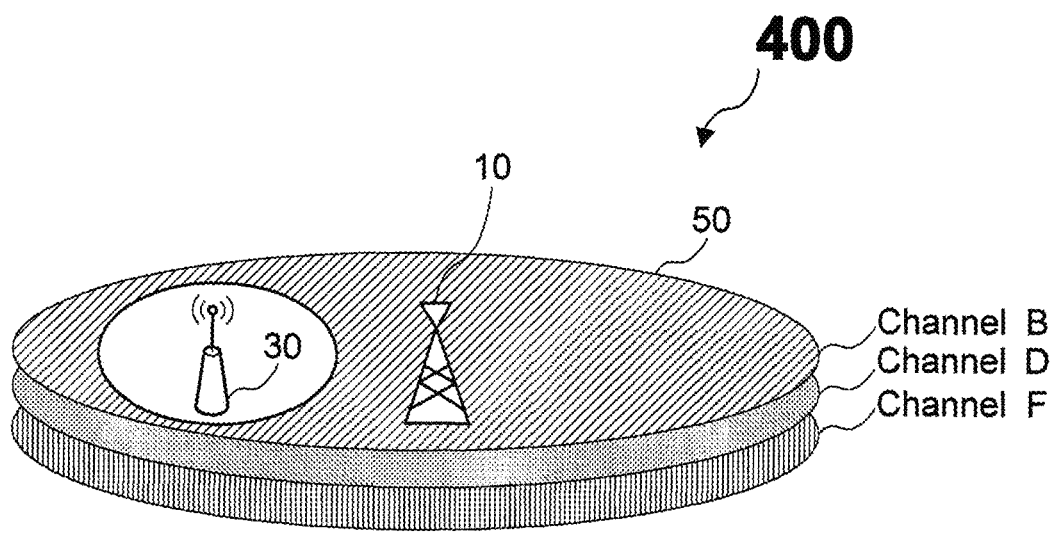
FIG. 4 is an illustration of an exemplary wireless communication environment using multiple operational frequencies in a single area for communication.

FIG. 4 is an illustration of an exemplary wireless communication environment 400 using multiple operational frequencies in a single area for communication. In order to handle increases in a number of subscribers, the macrocell base station 10 may often construct communication areas using multiple operational frequencies (hereinafter referred to as "channels") in a single area. For example, the single area 50 can use channels B, D, and F.

In order for the macrocell communication-monitoring module 101 to receive radio waves through a channel of a wireless terminal 20, it is necessary to apriori select a channel (monitoring channel) that the wireless terminal 20 uses to transmit an "assignment request for terminal identification data" to the macrocell during the idle handoff.

Figure 5:
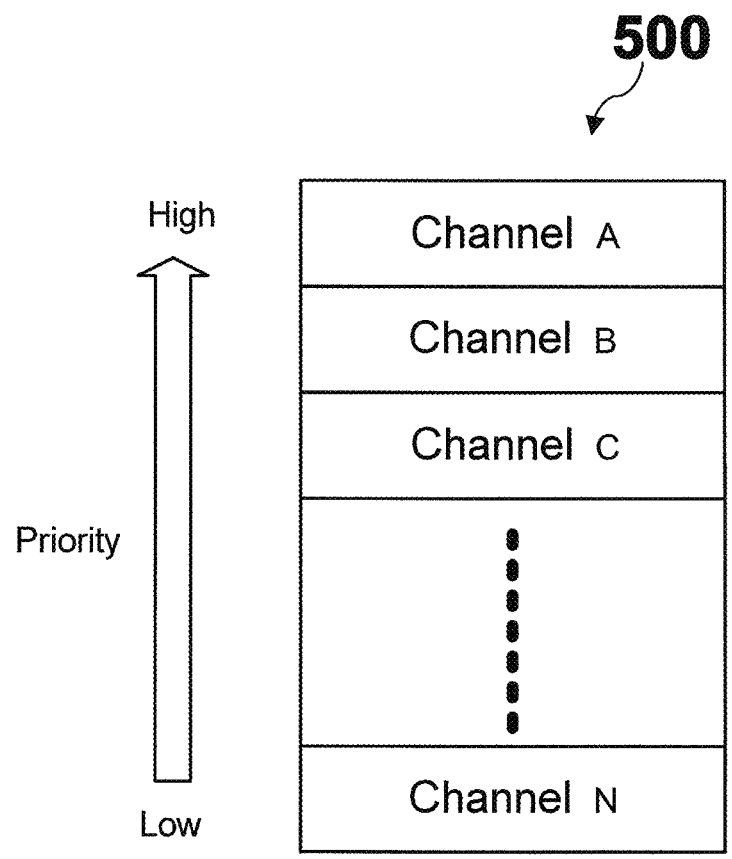
FIG. 5 is an illustration of an exemplary priority channel table.

FIG. 5 is an illustration of an exemplary priority channel table 500. The wireless terminal 20 stores the priority channel table 500, and when there is an opportunity to start a wireless communication, the wireless terminal 20 can select a high-priority channel by referring to the priority channel table 500 and searching for channels in a descending order of priority. For example, the wireless terminal 20 may search for channels A-N sequentially. Also, the memory module 109 stores an identical priority channel table as that stored by the wireless terminal 20. The priority frequency-processing module 104 specifies a channel used by the wireless terminal 20 when the macrocell communication-monitoring module 101 searches surrounding macrocells during an installation of the femtocell base station 30. For this reason, by using the channel specified by the priority frequency-processing module 104, the macrocell communication-monitoring module 101 can receive wireless signals transmitted from the wireless terminal 20 to the macrocell base station 10.

The channel used by the macrocell base station 10 may not necessarily be the same, and because channels may be added in order to handle increases in the number of subscribers, the channel with the highest priority may be periodically specified in addition to being specified during the installation of a femtocell base station.

Figure 6:
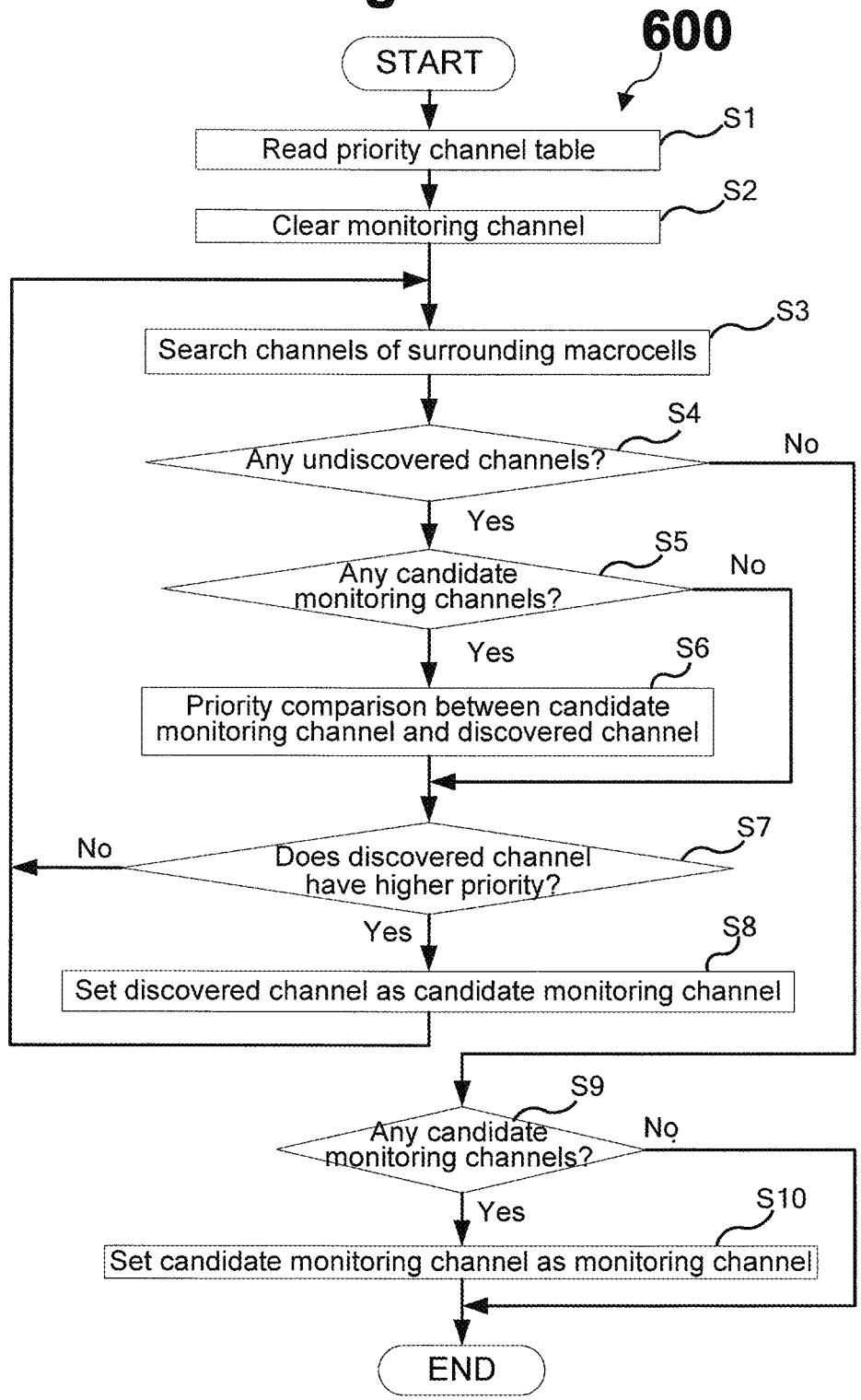
FIG. 6 is an illustration of an exemplary flowchart showing a process of a femtocell base station specifying a channel used by a wireless terminal, according to an embodiment of the present disclosure.
Figure 7:
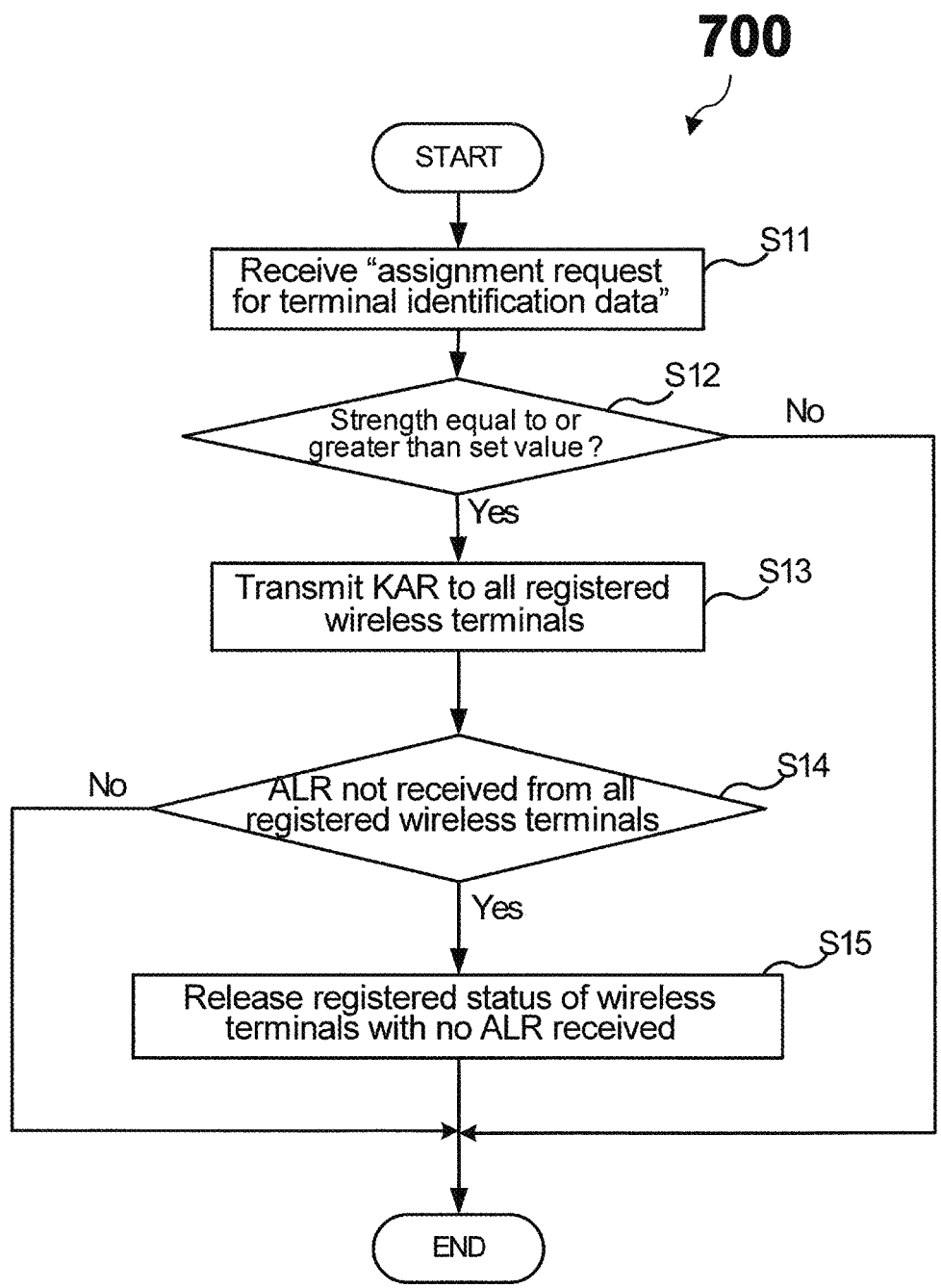
FIG. 7 is an illustration of an exemplary flowchart showing a control process of a femtocell base station for checking a registration status of a wireless terminal, according to an embodiment of the present disclosure.

FIG. 6-7 are illustrations of exemplary flowcharts showing processes 600-700 that can be performed by the femtocell base station 30 according to two embodiments of the disclosure.

The various tasks performed in connection with processes 600-700 may be performed by software, hardware, firmware, a computer-readable medium having computer executable instructions for performing the process method, or any combination thereof. The processes 600 may be recorded in a computer-readable medium such as a semiconductor memory, a magnetic disk, an optical disk, and the like, and can be accessed and executed, for example, by a computer CPU in which the computer-readable medium is stored. It should be appreciated that processes 600-700 may comprise any number of additional or alternative tasks, the tasks shown in FIGS. 6-7 need not be performed in the illustrated order, and processes 600-700 may be incorporated into a more comprehensive procedure or process having additional functionality not described in detail herein. For illustrative purposes, the following description of processes 600-700 may refer to elements mentioned above in connection with FIGS. 1-5. In practical embodiments, portions of processes 600-700 may be performed by different elements of the wireless terminal 20, the macrocell base station 10, and the femtocell base station 30/200 such as, the macrocell communication monitoring module 101, the macrocell communication processing module 102, the signal strength analysis module 103, the priority frequency processing module 104, the wire communication module 105, the femtocell communication module 106, the femtocell communication processing module 107, the registered terminal management module 108, the memory module 109, etc. Processes 600-700 may have functions, material, and structures that are similar to the embodiments shown in FIGS. 1-5. Therefore common features, functions, and elements may not be redundantly described here.

FIG. 6 shows the process 600 for specifying a channel (monitoring channel) used by the wireless terminal 20. The process 600 may be performed initially during the installation of the femtocell base station 30 or may be performed periodically thereafter.

Process 600 may begin by, the priority frequency processing module 104 reading the priority channel table 500 stored in the memory module 109 (task S1) and clearing the monitoring channel that is currently set in the macrocell communication monitoring module 101 (task S2).

The process 600 may then continue by, the priority frequency processing module 104 causing the macrocell communication monitoring module 101 to search for the channels used by the surrounding macrocell base stations (task S3). If an undiscovered channel is discovered during the search (Yes branch of inquiry task S4) and the priority frequency processing module 104 comprises a monitoring channel candidate (Yes branch of inquiry task S5), priority levels of the monitoring channel candidate and the discovered channel are compared according to the priority channel table 500 (task S6).

If the priority level of the discovered channel is higher (Yes branch of inquiry task S7), the priority frequency-processing module 104 sets the discovered channel as the monitoring channel candidate (task S8). Furthermore, task S8 may be performed even if there is no monitoring channel candidate (No branch of inquiry task S5).

Process 600 repeats tasks S4 through S8 until all channels in the priority channel table are searched. Then, if the undiscovered channel is not discovered or if all of the channels have been searched (No branch of inquiry task S4), and if there is a monitoring channel candidate (Yes branch of inquiry task S9: Yes), the priority frequency processing module 104 sets the candidate monitoring channel as the monitoring channel (task S10).

FIG. 7 is an exemplary flowchart showing a control process 700 for checking the registration status of a wireless terminal 20 by the femtocell base station 30. The femtocell base station 10 analyzes wireless signals received by the macrocell communication-monitoring module 101.

Process 700 may begin by the macrocell communication module 102 confirming that the received wireless signals comprise an "assignment request for terminal identification data" (task S11).

If the signal strength analysis module 103 determines that a received signal strength of the wireless signals used for the "assignment request for terminal identification data" (transmission signal strength) is equal to or greater than a set value (Yes branch of inquiry task S12), the registered terminal management module 108 checks the registration status of the wireless terminal 20. For example, the registered terminal management module 108 causes the femtocell communication module 106 to transmit respective KARs to registered wireless terminals (task S13). Furthermore, it is preferable that the KARs are transmitted after a fixed period of time (e.g., a period roughly equivalent to the time required to complete the idle handoff of a wireless terminal).

Otherwise, if the received signal strength of the wireless signals is below the set value, process 700 estimates that signals do not comprise an "assignment request for terminal identification data" transmitted from the coverage area periphery of the femtocell area 12, and are unrelated to the registered wireless terminals, and therefore, the registered terminal management module 108 does not have the KARs transmitted.

If an ALR is not received from the registered wireless terminals (Yes branch of inquiry task S14), the registered terminal management module 108 specifies the wireless terminals from which no ALR was received and cancels the registration status of those wireless terminals (task S15). Then, process 700 estimates that those wireless terminals have been handed off outside the femtocell area 12. In this manner, the femtocell base station 30 does not periodically transmit the KAR to the wireless terminal 20 to cause the wireless terminal 20 to transmit the ALR. Therefore, battery power of the wireless terminal 20 can be saved.

If an ALR is received from the registered wireless terminals (No branch of inquiry task S14), process 700 ends. Moreover, if the received signal strength of the wireless signals (transmission signal strength) is below a set value (No branch of inquiry task S12) process 700 ends.

Furthermore, if wireless signals received by the macrocell communication-monitoring module 101 are analyzed in task S11, the signal strength analysis module 103 may determine whether the received signal strength of the wireless signals used for the "assignment request for terminal identification data" (transmission signal strength) is equal to or greater than a set value in task S12. If the strength of the wireless signals (transmission signal strength) is equal to or greater than the set value, the macrocell communication-processing module 102 confirms whether the received wireless signals are an "assignment request for terminal identification data".

Figure 8:
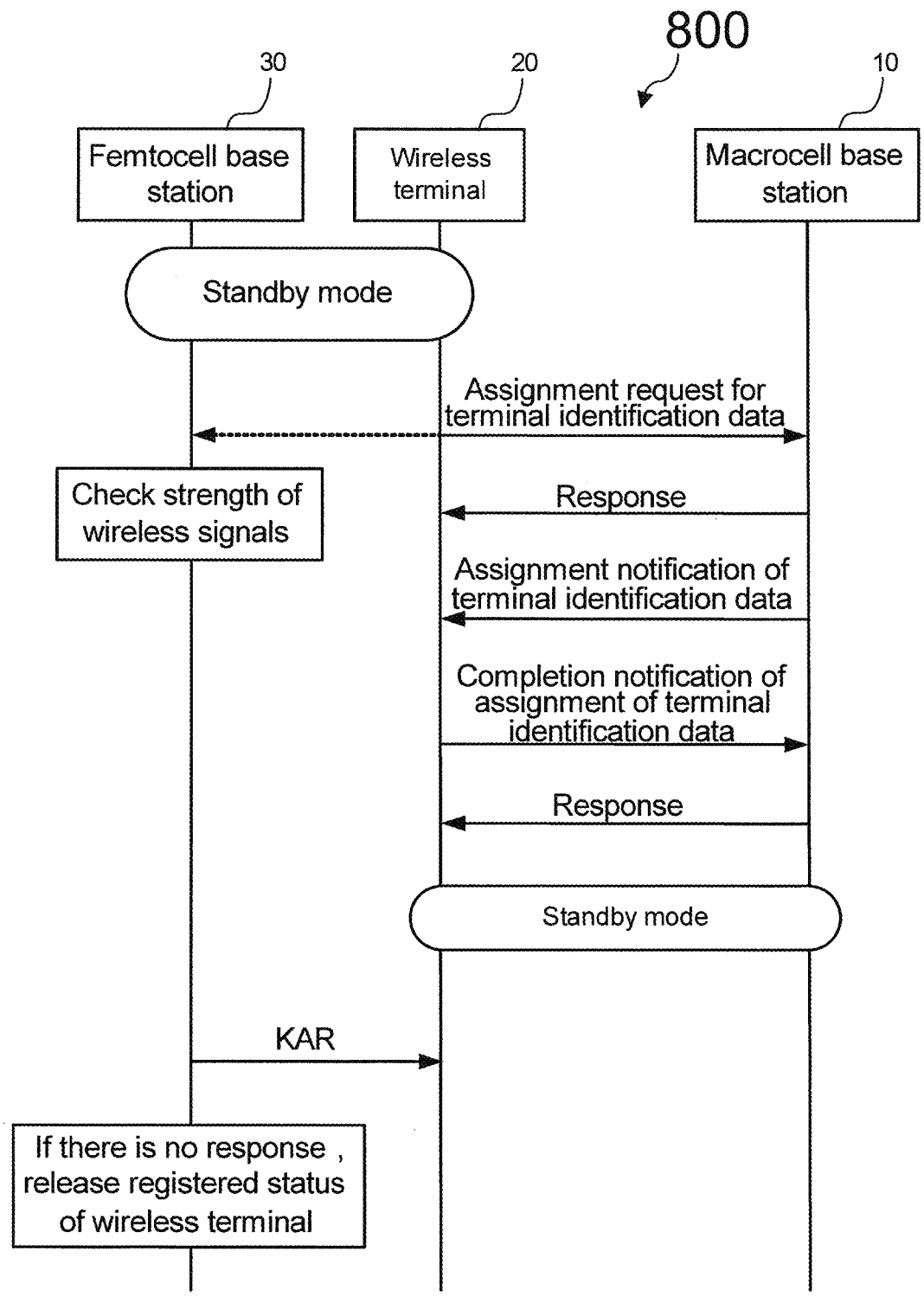
FIG. 8 is an illustration of an exemplary sequence diagram showing a femtocell base station process, according to an embodiment of the present disclosure.

FIG. 8 is an illustration of an exemplary sequence diagram showing a process 800 that can be performed by a femtocell base station 30 according to an embodiment of the disclosure. The wireless terminal 20 transmits a message that comprises an "assignment request for terminal identification data" to the macrocell base station 10. Then, the femtocell base station 30 checks that message as described in the task S11. If the received received signal strength of the wireless signals at the macrocell communication-monitoring module 101 used for the "assignment request for terminal identification data" (transmission signal strength) is equal to or greater than a set value as described in the task S12, the femtocell base station 30 transmits a KAR to the registered wireless terminals after a fixed period has elapsed.

If an ALR is not received from the registered wireless terminals, as described in the task S15, the femtocell base station 30 specifies the wireless terminals from which the ALR was not received and cancels the registration status of those wireless terminals.

As described above, if wireless signals transmitted by the wireless terminal 20 comprise information indicating an attempt to connect to another base station and the wireless terminal 20 is located in the coverage area periphery of the femtocell base station 30, the femtocell base station 30 can substantially immediately determine the registration status of the wireless terminal 20, from which no notification is transmitted during handoff, in order to check the registration status of the wireless terminal 20. Moreover, because the femtocell base station 30 does not periodically transmit the KAR to the wireless terminal 20 to cause the wireless terminal 20 to transmit the ALR, unnecessary consumption of the battery power of the wireless terminal 20 can be prevented.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

In this document, the terms "computer program product", "computer-readable medium", and the like may be used generally to refer to media such as, for example, memory, storage devices, or storage unit. These and other forms of computer-readable media may be involved in storing one or more instructions for use by the macrocell communication processing module 102, the signal strength analysis module 103, the priority frequency processing module 104, the femtocell communication-processing module 107, and the like, to cause these modules to perform specified operations. Such instructions, generally referred to as "computer program code" or "program code" (which may be grouped in the form of computer programs or other groupings), when executed, enable the method for operating an information device such as the femtocell base station 30.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A femtocell base station comprising:
   a communication module operable to communicate with a wireless terminal;
   a monitoring module operable to directly monitor wireless signals transmitted by the wireless terminal to a macrocell base station;
   an information determination module operable to determine whether the monitored wireless signals comprise attempt-to-connect information indicating an attempt to connect to the macrocell base station;
   an analysis module operable to determine whether the wireless terminal is located in a femtocell coverage area periphery of the femtocell base station based on the monitored wireless signals, wherein the femtocell coverage area periphery of the femtocell base station is within a macrocell coverage area periphery of the macrocell base station; and
   a management module operable to transmit a presence checking signal to the wireless terminal, if the monitored wireless signals comprise the attempt to connect information and the wireless terminal is in the femtocell coverage area periphery, wherein the management module does not transmit the presence checking signal to the wireless terminal if the monitored wireless signals comprise the attempt-to-connect information and the wireless terminal is not in the femtocell coverage area periphery.

2. The femtocell base station according to claim 1, wherein the management module is further operable to cancel the registration status of the wireless terminal, if the wireless terminal does not respond to the presence checking signals.

3. The femtocell base station according to claim 1, wherein the connection information comprises at least one of the group consisting of:
   an assignment request for terminal identification data; and
   a location registration in the macrocell base station.

4. The femtocell base station device according to claim 3, wherein the registration status is checked, if the monitored wireless signals comprise the assignment request for terminal identification data and have a received signal strength greater than or equal to a set value.

5. The femtocell base station according to claim 1, wherein the wireless terminal is determined to be located in the femtocell coverage area periphery, if a received signal strength of the monitored wireless signals received by the monitoring module is equal to or greater than a predetermined value.

6. The femtocell base station according to claim 1, further comprising a memory module operable to store a priority channel table and registration information of the wireless terminal.

7. A method of controlling a femtocell base station, the method comprising:
   directly monitoring wireless signals transmitted by a wireless terminal to a macrocell base station;
   determining whether the directly monitored wireless signals indicate an attempt to connect to the macrocell base station;
   determining whether the wireless terminal is located in a femtocell coverage area periphery of the femtocell base station, wherein the femtocell coverage area periphery of the femtocell base station is within a macrocell coverage area of the macrocell base station;
   transmitting presence checking signals to the wireless terminal if the wireless terminal is located in the femtocell coverage area periphery of the femtocell base station, and if the directly monitored wireless signals indicate the attempt to connect to the macrocell base station; and
   not transmitting the presence checking signals to the wireless terminal if the wireless terminal in not in the femtocell coverage area periphery of the femtocell base station, and if the directly monitored wireless signals indicate the attempt to connect to the macrocell base station.

8. The method according to claim 7, wherein determining whether the wireless terminal is located in the coverage area is based upon the directly monitored wireless signals.

9. The method according to claim 7, further comprising canceling a registration status of the wireless terminal with the femtocell, if the wireless terminal does not respond to the presence checking signals.

10. The method according to claim 7, wherein the monitored wireless signals that indicate an attempt to connect to the macrocell base station comprise at least one of the group consisting of:
    an assignment request for terminal identification data; and
    a location registration in the macrocell base station.

11. The method according to claim 7, further comprising determining the wireless terminal is located in the femtocell coverage area periphery, if a received signal strength of the directly monitored wireless signals is equal to or greater than a predetermined value.

12. The method according to claim 7, wherein the directly monitored wireless signals comprise an assignment request for terminal identification data.

13. The method according to claim 12, wherein the registration status is checked, if a received signal strength of the directly monitored wireless signals is greater than or equal to a set value.

14. A non-transitory computer readable medium comprising program code for operating a first information device, the program code for:
   directly monitoring wireless signals transmitted by a wireless terminal to a second information device;
   determining whether the directly monitored wireless signals comprise attempt-to-connect information indicating an attempt of the wireless terminal to connect to the second information device;
   determining whether the wireless terminal is located in a first coverage area periphery of the first information device based on the directly monitored wireless signals, wherein the first coverage area periphery of the first information device is within a second coverage area of the second information device;
   transmitting presence checking signals to the wireless terminal if the wireless terminal is located in the first coverage area periphery of the first information device and if the directly monitored wireless signals indicate the attempt-to-connect information to the second information device; and
   not transmitting the presence checking signals to the wireless terminal if the wireless terminal in not located in the first coverage area periphery of the first information device, and if the directly monitored wireless signals indicate the attempt-to-connect information to the second information device.

15. The non-transitory computer readable medium according to claim 14, further comprising program code for canceling the registration status of the wireless terminal, if the wireless terminal does not respond to the presence checking signals.

* * * * *